Patented July 6, 1937

2,086,084

UNITED STATES PATENT OFFICE 2,086,084

PREPARATION OF ALKALI NITRATE BY THE REACTION OF NITRIC ACID WITH ALKALI CHLORIDE IN AQUEOUS SOLUTION

Paul Kubelka, Prague, Czechoslovakia

No Drawing. Application January 10, 1935, Serial No. 1,257. In Germany January 15, 1934

20 Claims. (Cl. 23—102)

If attempts are made to cause nitric acid to react with alkali chloride in aqueous solution, only a portion of the dissolved alkali salt separates out in the form of solid nitrate when cooled, while a large part of the alkali salt is conveyed away with the mother liquor containing nitric acid. The utilization of the nitric acid as well as the alkali chloride is too incomplete for this process to assume practical importance.

In order to eliminate the disturbing influence exerted by the chlorine ion in the reaction, it has been proposed to precipitate it in the form of lead chloride. The alkali nitrate remaining in solution however then always contains appreciable amounts of lead salt and must be subjected to a separate purification.

It has also been proposed, to separate basic calcium chloride (calcium oxychloride) from solutions containing calcium nitrate and alkali chloride by the addition of calcium hydroxide and to crystallize alkali nitrate from the remaining mother liquors. Since however the chlorine ion of the reaction solution is not completely removed by the separation of calcium oxychloride, but is merely reduced to about 80–120 grams Cl per litre, this process, if it is to yield satisfactory amounts, requires several repetitions of the precipitation and crystallization or the creation of a cycle process.

It has been found that pure alkali nitrate can be obtained directly in an approximately quantitative yield from nitric acid and alkali chloride, if cuprous oxide or cupric oxide and metallic copper are allowed to act on the reaction components, for the purpose of separating approximately the entire chlorine ion of the reaction solutions in the form of cuprous chloride. When suitable reaction conditions are observed, the reaction solution located above the deposited body of cuprous chloride, contains pure alkali nitrate, which can be obtained by simply evaporating. Instead of cuprous oxide and cupric oxide use may of course also be made of the corresponding hydroxides and carbonates.

The acidity of the reaction liquid must be kept within certain limits to secure the result arrived at by the invention. The upper limit for the pH value of the liquid is the natural pH value of an aqueous suspension of cuprous oxide, which is around about 7. The lower limit for the pH value is that of a nitric acid solution which is just completely dissociated, for undissociated nitric acid, contrary to the $NO_3'$ ion, is an oxidizing agent and if present would oxidize the cuprous oxide and itself be reduced to oxides of nitrogen. Acid solutions having pH exceeding unity may be regarded as completely dissociated, and this represents the lower limit for the pH value of the reaction liquid.

For carrying out the process use may be made for instance as primary material of a saturated alkali chloride solution, to which is added an amount of cuprous oxide sufficient for converting the entire chlorine ion into cuprous chloride. If nitric acid is gradually introduced into this system, cuprous chloride and alkali nitrate are formed in proportion to the supply of acid; after the addition of the equivalent amount of nitric acid, approximately the whole of the deposited body consists of cuprous chloride, while the solution contains all the alkali in the form of alkali nitrate.

The reaction is preferably not carried to the absolute end point, since otherwise small amounts of cupric salts may be formed which pass into solution. It has proved advantageous to terminate the reaction as soon as the chlorine ion content of the solution has dropped to an amount of 0.3 to 1 gr. per litre.

The reaction may however also be carried to the end point which corresponds to a chlorine ion content of about 0.03 gr. per litre, but then the copper that is in solution must be removed in a suitable manner, for instance by the addition of small amounts of alkali carbonate or freshly precipitated cuprous oxide. In order to limit the formation of soluble cupric salts as far as possible, in addition at the outset a small amount of finely divided reactive copper can be introduced with or beside the cuprous oxide.

The foregoing method may be modified extensively. For instance the cuprous oxide may first of all be dissolved in the nitric acid while vigorously stirring, a solution of cupric nitrate being formed, in which the equivalent amount of finely divided metallic copper is suspended, and then this suspension is treated with the requisite amount of alkali chloride in solid or dissolved form. In such case preferably such concentrations are maintained that an approximately saturated alkali nitrate solution is formed, which when cooled already begins to crystallize out.

A mixture of equivalent parts of cupric oxide and metallic copper may however also be suspended in the solution of alkali chloride and then nitric acid allowed to flow in gradually, or cupric oxide may be dissolved in the nitric acid and the resulting cupric nitrate solution added to the alkali chloride solution in which the metallic copper has been suspended. Favourable results are also obtained when nitric acid and cuprous oxide, converted into the form of a paste, are allowed to flow separately but simultaneously into the alkali chloride solution, while continually maintaining the equivalent ratio.

The cuprous chloride formed in the reaction may be re-converted again into cuprous oxide in a simple manner. For this purpose for instance the washed cuprous chloride precipitate is treated with milk of lime, or with a suspension of ground calcium carbonate, dolomite or the like at boiling heat. The cuprous oxide obtained in this way returns to the process immediately after washing.

The cuprous oxide may however also be regenerated with simultaneous obtention of hydrochloric acid by the action of steam on the washed cuprous chloride precipitate while hot. In such a case a distillate of hydrochloric acid is obtained and an adequately reactive cuprous oxide which returns to the process.

The separated cuprous chloride can finally also be converted back into cupric oxide and metallic copper, one half being treated for instance with steam and air and the other half reduced in a stream of hydrogen.

*Examples*

1. In a reaction vessel with a high speed vigorously operating stirring mechanism, a paste consisting of 76.6 kgs. cuprous oxide, 5 kgs. finely divided copper (e. g. cement copper), 58.5 kgs. NaCl and 38 kgs. water is made into a suspension in 50 litres water and through a tube terminating below the surface of the liquid 145 kgs. 45% nitric acid (corresponding to 63.6 kgs. 100% nitric acid) are introduced in the course of 1 to 1.5 hours while continually stirring. The stirring is continued further for about a quarter of an hour and then small amounts of sodium carbonate are added until a filtered sample of the suspension after acidification just gives a weak precipitate with silver nitrate (corresponding to about 0.3 to 0.6 gram Cl per litre) and a second sample boiled with concentrated nitric acid, when excess ammonia is added, no longer shows any clear blue coloration.

From the suspension which is hot owing to the heat of the reaction, the solid component is now separated by centrifuging or otherwise and washed with 50 to 70 kgs. water. The washing liquor which consists of a practically pure sodium nitrate solution, can be evaporated together with the solution centrifuged off. In such a way 85 kgs. of pure white sodium nitrate containing only traces of chloride and lime are obtained.

The washing liquor may however also be used with advantage in a subsequent operation instead of pure water for making the suspension of cuprous oxide and sodium chloride. The amount of water to be evaporated is diminished to no inconsiderable extent thereby.

The centrifuged and washed precipitate which contains 99.1 kgs. CuCl, 5 kgs. $Cu_2O$, about 1 kg. $NaNO_3$, and 22 kgs. water, is made into a suspension in milk of lime which contains 46.4 kgs. $Ca(OH)_2$ and 300–400 kgs. water and boiled for a few minutes until the originally yellow colour has changed into a brilliant red. Thereupon the precipitate is washed as free from calcium chloride as possible by decanting with water and finally centrifuged. The remaining cuprous oxide paste having the composition given in the foregoing returns into the process.

A similar method is adopted only with a corresponding modification of the amounts of the mixture, when preparing potassium nitrate from potassium chloride.

2. In a reaction vessel with an intensively operating stirring mechanism a paste containing 72.3 kgs. cuprous oxide, 6 kgs. finely divided metallic copper and 40 kgs. water is made into a suspension in 90 kgs. of a 25% sodium nitrate solution (washing liquor from preceding process) and through a tube terminating below the surface of the liquid in direct proximity to the stirrer, 50% nitric acid is allowed to flow in slowly until the solution is slightly acid (about pH=2). For this purpose 127.2 kgs. of nitric acid of the given concentration are required. Into the suspension of metallic copper in cupric nitrate solution thus obtained, about 50 kgs. rock salt are now introduced rapidly and then further small portions are introduced slowly and while continuously stirring until a filtered sample shows about 0.2 gr. Cl per litre and only traces of Cu. The total consumption of rock salt is in such a case about 59.1 kgs. NaCl (100%).

From the suspension which is hot owing to the heat of the reaction the solid portion which consists substantially of cuprous chloride, is separated by centrifuging or filtering and washed with 50–70 kgs. water. The washing liquor returns to the process and serves for the preparation of a fresh cuprous oxide suspension.

The filtered solution is freed from small amounts of dissolved copper by the addition of small amounts of soda, soda lye and the like or by the addition of excess cuprous oxide, and evaporated. In order to save purifying the method adopted may also be such that only the main portion of the sodium nitrate is crystallized out and the mother lye, which then contains small amounts of dissolved copper, is returned to the process.

In addition solutions free from copper are obtained directly if the addition of nitric acid to the cuprous oxide suspension is interrupted before all the cuprous oxide is converted.

The separated and washed cuprous chloride may be regenerated to cuprous oxide as described in Example 1. By varying the ratios potassium nitrate can also be obtained from potassium chloride in the same way.

What I claim is:—

1. A method of making alkali nitrate by the interaction of approximately equimolecular quantities of alkali chloride and nitric acid, consisting in carrying out the interaction in the presence of approximately half an equimolecular quantity of cuprous oxide, the reaction liquid having a pH value greater than unity but not greater than the pH value of an aqueous cuprous oxide suspension, separating the liquid from the deposit of cuprous chloride which forms and which contains practically all the chlorine of the alkali chloride employed, and evaporating the separated liquid.

2. A method of making alkali nitrate by the interaction of approximately equimolecular quantities of alkali chloride and nitric acid, consisting in carrying out the interaction in the presence of approximately an equimolecular quantity of cupric oxide and of metallic copper, the reaction liquid having a pH value greater than unity but not greater than the pH value of an aqueous cuprous oxide suspension, separating the liquid from the deposit of cuprous chloride which forms and which contains practically all the chlorine of the alkali chloride employed, and evaporating the separated liquid.

3. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide theoretically sufficient for the copper thereof to combine with the chlorine of the alkali chloride to form cuprous chloride, the pH value of the reaction liquid being kept at greater than unity but not greater than the pH value of an aqueous cuprous oxide suspension, separating the liquid from the deposit of cuprous chloride which forms and which contains practically all the chlorine of the alkali chloride employed, and evaporating the separated liquid.

4. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide in excess of the amount theoretically sufficient for the copper thereof to combine with the chlorine of the alkali chloride to form cuprous chloride, the pH value of the reaction liquid being kept at greater than unity but not greater than the pH value of an aqueous cuprous oxide suspension, separating the liquid from the deposit of cuprous chloride which forms and which contains practically all the chlorine of the alkali chloride employed, and evaporating the separated liquid.

5. A method as claimed in claim 3 in which a small amount of finely divided metallic copper is held in suspension with the cuprous oxide.

6. A method as claimed in claim 4 in which a small amount of finely divided metallic copper is held in suspension with the cuprous oxide.

7. A method of making alkali nitrate by the interaction of approximately equimolecular quantities of alkali chloride and nitric acid, consisting in causing the nitric acid to react gradually with an aqueous alkali chloride solution containing cupric oxide and an amount of metallic copper equivalent thereto, the total amount of the element copper present being sufficient to form cuprous chloride with the whole of the chlorine of the alkali chloride used, and the pH value of the reaction liquid being kept at greater than unity but not greater than the pH value of an aqueous cuprous oxide suspension, separating the liquid from the deposit of cuprous chloride which forms and which contains practically all the chlorine of the alkali chloride employed, and evaporating the separated liquid.

8. A method of making alkali nitrate by the interaction of approximately equimolecular quantities of alkali chloride and nitric acid, consisting in dissolving in nitric acid a quantity of cupric oxide equivalent thereto and causing the same to react with an alkali chloride solution containing in suspension a quantity of finely divided metallic copper equivalent thereto, the pH value of the reaction liquid being kept at greater than unity but not greater than the pH value of an aqueous oxide suspension, separating the liquid from the deposit of cuprous chloride which forms and which contains practically all the chlorine of the alkali chloride employed, and evaporating the separated liquid.

9. A method as claimed in claim 1 in which the cuprous oxide is first mixed with nitric acid, the pH value of the liquid during the reaction being kept at greater than unity, whereupon the alkali chloride is added to the resulting suspension of metallic copper in cupric nitrate solution.

10. A method as claimed in claim 2 in which nitric acid and cuprous oxide in paste form are added separately but simultaneously to alkali chloride solution.

11. A method as claimed in claim 3 in which the cuprous chloride formed is converted into cuprous oxide.

12. A method of making alkali nitrate by the interaction of approximately equimolecular quantities of alkali chloride and nitric acid, consisting in carrying out the interaction in the presence of approximately half an equimolecular quantity of cuprous oxide, the reaction liquid having a pH value greater than unity but not greater than the pH value of an aqueous cuprous oxide suspension, continuing the reaction until the chlorine ion concentration of the liquid has dropped to 0.3 to 1 g. per litre, then separating the liquid from the deposit of cuprous chloride which forms, and evaporating the separated liquid.

13. A method as claimed in claim 1 in which the cuprous chloride formed is converted into cuprous oxide.

14. A method of making alkali nitrate by the interaction of approximately equimolecular quantities of alkali chloride and nitric acid, consisting in carrying out the interaction in the presence of approximately half an equimolecular quantity of cuprous oxide, the reaction liquid having a pH value greater than unity but not greater than the pH value of an aqueous cuprous oxide suspension, separating the liquid from the deposit of cuprous chloride which forms and which contains practically all the chlorine of the alkali chloride employed, removing any copper salts that may be contained in the separated liquid, and finally evaporating the liquid.

15. A method of making alkali nitrate by the interaction of approximately equimolecular quantities of alkali chloride and nitric acid, consisting in carrying out the interaction in the presence of approximately an equimolecular quantity of cupric oxide and of metallic copper, the reaction liquid having a pH value greater than unity but not greater than the pH value of an aqueous cuprous oxide suspension, separating the liquid from the deposit of cuprous chloride which forms and which contains practically all the chlorine of the alkali chloride employed, removing any copper salts that may be contained in the separated liquid, and finally evaporating the liquid.

16. A method of making alkali nitrate by the interaction of approximately equimolecular quantities of alkali chloride and nitric acid, consisting in carrying out the interaction in the presence of approximately an equimolecular quantity of cupric oxide and of metallic copper, the reaction liquid having a pH value greater than unity but not greater than the pH value of an aqueous cuprous oxide suspension, continuing the reaction until the chlorine ion concentration has dropped to 0.3 to 1 g. per litre, separating the liquid from the deposit of cuprous chloride which forms and which contains practically all the chlorine of the alkali chloride employed, and evaporating the separated liquid.

17. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide theoretically sufficient for the copper thereof to combine with the chlorine of the alkali chloride to form cuprous chloride, the pH value of the reaction liquid being kept at greater than unity but not greater than the pH value of an aqueous cuprous oxide suspension, continuing the reaction until the chlorine ion concentration has dropped to 0.3 to 1 g. per litre, separating the liquid from the deposit of cuprous chloride which forms and which contains practically all the chlorine of the alkali chloride employed, and evaporating the separated liquid.

18. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide in excess of the amount theoretically sufficient for the copper thereof to combine with the chlorine of the alkali chloride to form cuprous chloride, the pH value of the reaction liquid being kept at greater than unity but not greater than the pH value of an aqueous cuprous oxide suspension, continuing the reaction until the chlorine ion concentration has dropped to 0.3 to 1 g. per litre, separating the liquid from the deposit of cuprous chloride which forms and which contains practically all the chlorine of the alkali chloride employed, and evaporating the separated liquid.

19. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide theoretically sufficient for the copper thereof to combine with the chlorine of the alkali chloride employed, the pH value of the reaction liquid being kept at greater than unity but not greater than the pH value of an aqueous cuprous oxide suspension, removing any copper salts that may be contained in the separated liquid, and finally evaporating the liquid.

20. A method of making alkali nitrate by the interaction of approximately equimolecular quantities of alkali chloride and nitric acid, consisting in gradually adding nitric acid to an aqueous alkali chloride solution which contains in suspension a quantity of cuprous oxide in excess of the amount theoretically sufficient for the copper thereof to combine with the chlorine of the alkali chloride employed, the pH value of the reaction liquid being kept at greater than unity but not greater than the pH value of an aqueous cuprous oxide suspension, removing any copper salts that may be contained in the separated liquid, and finally evaporating the liquid.

PAUL KUBELKA.